Patented Sept. 1, 1942

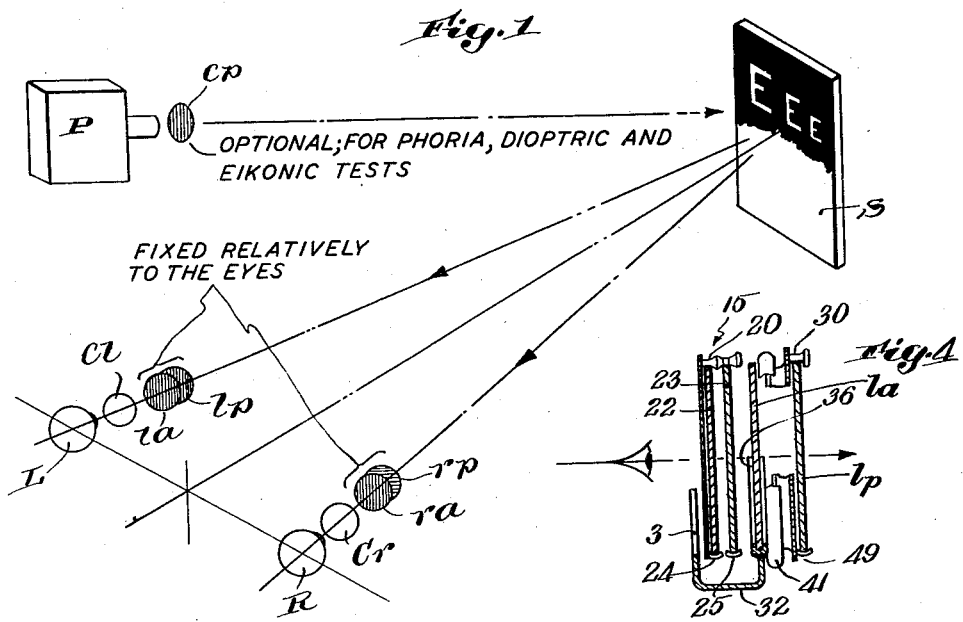
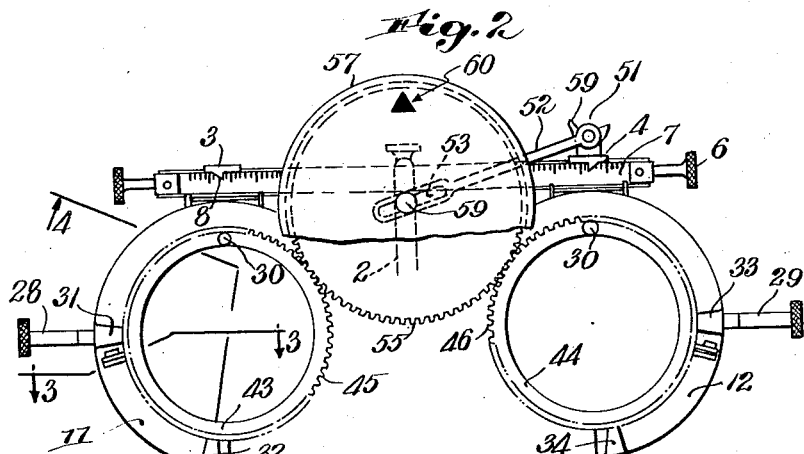
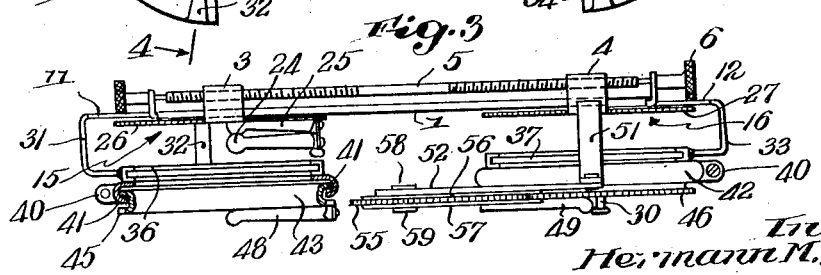

2,294,382

UNITED STATES PATENT OFFICE 2,294,382

BINOCULAR EYE TEST

Hermann M. Burian, Hanover, N. H., assignor to Trustees of Dartmouth College, Hanover, N. H., a corporation of New Hampshire Application November 4, 1939, Serial No. 302,809

3 Claims. (Cl. 88—20)

The present invention relates to binocular testing of eyes with polarized light.

It has heretofore been proposed, as for example in copending application Serial No. 173,110, filed November 6, 1937, to differentiate the images of a test object in the eyes of a patient by polarizing the light flux coming from part of that object in one plane, or in two crossed planes for different portions of the object, analyzers placed before the eyes in proper angular relation to the polarized light flux distinguishing between polarized and unpolarized light or light polarized in different planes. If an analyzer is placed in definite spatial relation to the polarization plane of the light flux, rather complicated holding apparatus is necessary, whereas, if the analyzer is fixed relatively to the eyes, as for example with a trial frame, any slight movement of the head offsets the polarization effect to a very noticeable degree, unless the head is fixated with a head rest which often defeats the very purpose of using a trial frame. This disadvantage is especially pronounced if the above-indicated testing principle is applied to a malingering test, with the idea of separately testing the visual acuity of each respective eye of a person in such a manner that he has during the test no possibility of determining which eye is being tested.

It is one of the principal objects of my invention to provide a test involving the differentiation of a test object for the respective eyes with polarized light, by avoiding any sources of error due to movement of the head relatively to a polarizing means or a test object; other objects of the invention are to provide a very simple malingering test requiring as special equipment merely a trial frame which, besides, is also suitable for other tests involving dissociation of the eyes, and to provide a trial frame which can be used for carrying out malingering tests and other tests by dissociating the eyes in simple yet especially complete manner, practically unhampered by external influences.

These objects are accomplished, according to the invention, by fixing both polarizers and analyzers relatively to the eyes and, according to one specific feature, perception of a test image can be gradually shifted from one eye to another. In still another aspect, the invention accomplishes more perfect dissociation of of the ocular images of test objects sending forth a flux of polarized light.

These and other objects, aspects and features of the invention will be apparent from a detailed description of several embodiments thereof illustrating its genus by way of example referring to a drawing in which:

Fig. 1 is a diagram explaining various tests according to the invention;

Fig. 2 is a front view of a trial frame incorporating the invention;

Fig. 3 is a top view, partly in section, on line 3—3 of Fig 2; and

Fig. 4 is a section on line 4—4 of Fig. 2.

In Fig. 1, S is a test object, for example a Snellen chart, either printed or projected from a projector P on a reflecting screen, and preferably having white letters or other patterns on a black background. Charts of this type (which are not part of the present invention) are preferable because, due to the reduced contrast between the test type and the background even the largest test pattern can be caused to disappear by applying crossed polarizing material whose extinction effect would not be sufficient wholly to extinguish black type on a white backing.

The left and right eye are indicated at L and R, respectively, and conventional corrective lenses which may be placed before the eyes are indicated at Cl and Cr. In front of each eye, and in fixed relation to the eyes are arranged two polarizing means lp, la and rp, ra, as for example the polarizing sheet material now available on the market. The polarizer sheets lp and rp, and the analyzer sheets la and ra may be supported in fixed relation to a conventional head rest, but preferably they are applied to a trial frame in the manner now to be described.

Figs. 2, 3 and 4 show a conventional trial frame adapted for purposes of the invention. In these figures, I (Fig. 3) is the main bar of the frame with an adjustable nose rest 2 (Fig. 2) and two slides 3, 4 which can be shifted by means of a spindle 5 having right-hand and left-hand threads engaging tapped holes of respective slides and thumb wheels 6 for rotating the spindle, and thereby shifting the slides in order to accommodate different pupillary distances which may be read from scale 7 on bar I by means of indicators 8.

Fastened to slides 3 and 4 are ring segments 11 and 12, respectively, rotatably supporting in conventional manner rotatable trial lens holders 15 and 16. As shown especially in Figs. 3 and 4, each holder comprises a pin 20 with two notches for trial lenses 22 and 23, and two leaf springs 24, 25, holding the lenses against the notched pins.

Toothed gear rims 26, 27 permit rotation of the trial lenses, by means of bevel gears and thumb wheels 28 and 29, in order to turn the trial cylinders into their proper axes.

Fastened to segments 11 and 12 by means of brackets 31, 32, 33, 34, are analyzer holders 36, 37, preferably welded to their brackets and provided for receiving polarizing sheets la and ra indicated in Fig. 1.

Welded or otherwise fastened to holders 36, 37 are grooved rings 41, 42, respectively, for mounting purposes split at 40, and rotatably engaging polarizer holders 43, 44, respectively, with toothed gear rims 45, 46, respectively. Each polarizer holder has a pin 30 and springs 48, 49, respectively, arranged (Fig. 4) similar to elements 20, 24 and 25 for receiving polarizing sheet material lp and rp, as indicated in Fig. 1.

To one slide, for example 4, is fastened by means of hinge 51 a gear-holding arm 52 with slotted journal portion 53. A gear wheel 55 with two rims 56, 57 rotates in slot 53 by means of rimmed axle portions 58, 59 and is able to slide in slot 53 in order to accommodate different distances of gear rims 45, 46 corresponding to different pupillary distances. The rims 56 and 57 retain the three gear wheels, which have to be rather thin, in engagement. It will be evident that, by manually rotating finger wheel 55, both polarizer holders can be rotated through equal angles. If it is desired to control the polarizer holders separately, wheel 55 can be lifted out of engagement, and held in inoperative position by stops 59 of hinge 51. As indicated at 60, the fingerwheel 55 may have marks, or stops, limiting its rotation, and therefore that of the polarizers in holders 48 and 49, to angles corresponding to the test for which the trial frame is to be used.

Test equipment of this type may be used in the following manner.

The person to be examined is placed at a suitable distance before the test chart S, and for example provided with a trial frame, as shown in Figs. 2 to 4. Inserted in analyzer holders 36 and 37 will be sheets effecting polarization in parallel planes, as indicated at la and ra of Fig. 1.

In polarizer holders 48 and 49 with pins 30 will be inserted sheets polarizing in planes crossing at 90°, as also indicated in Fig. 1. It will be evident that, if the polarizing sheets la, lp, ra, rp are located as shown in Fig. 1, the person wearing the trial frame will see test object S, projected with unpolarized light, with the left eye but not with the right eye, and that it will be irrelevant how he holds his head, since the relative position of polarizers and analyzers is determined only by the trial frame which moves with the head.

With fingerwheel 55 lifted, the polarizers can be rotated at will, by means of toothed rims 45, 46. If it is desired to rotate both polarizers simultaneously, wheel 55 is swung into engagement with rims 45, 46. If the effective axes of the polarizers are then crossed at a 90° angle, rotation of fingerwheel 55 will shift visibility of the test object from one eye to the other, with an intermediate position for which the object is visible to both eyes, although at somewhat reduced intensity. This shifting of the image will be accomplished without any possibility of the patient discerning its cause and without substantial change of the average light flux reaching the eyes. If the patient keeps on reading a test chart while visibility is gradually shifted from one eye to the other, he obviously is able to see with both eyes.

It will now be evident that the test object may either be printed or projected, that the fixed polarizing sheets may be used with crossed axes and the rotating ones with parallel axes, that either analyzers or polarizers, or both, may be rotatable, and that a similar system may be used to advantage in apparatus fixed relatively to the test object.

The same apparatus may also be utilized for other than malingering tests if a polarizer is inserted in the beam of projector P, as indicated at cp of Fig. 1. An instrumentation of this type may then be used for all purposes where total or partial dissociation of the two eyes is required, as in testing phorias, in measuring aniseikonia or in determining the dioptrics of an eye while maintaining binocular fusion. Ways in which such tests can be carried out are described in detail in the above copending application.

In all these last-mentioned instances image perceptance can be very conveniently distributed between the two eyes, merely by rotating the analyzers either synchronously or separately.

It should be understood that the present disclosure is for the purpose of illustration only and that this invention includes all modifications and equivalents which fall within the scope of the appended claims.

I claim:

1. Ophthalmological apparatus for viewing a test object, comprising means for holding optical test elements before the eyes of a patient in substantially fixed relation thereto, a polarizing means mounted on said holding means before each eye, respectively, a second polarizing means for each eye mounted on said holding means superimposed on said first polarizing means, respectively, and means for rotating said first polarizing means relatively to said second polarizing means, the axes of polarization of said polarizing means being so arranged that the total light flux passing through the polarizing means before both eyes remains substantially constant during said rotation, so that visibility of the test object viewed through said polarizing means can be gradually shifted from one eye to the other.

2. Ophthalmological apparatus for binocular tests involving differentiation of the images of a test object in the eyes of a person, comprising a test object, means for holding optical test lens elements before the eyes of a patient in substantially fixed relation thereto and for observation of said test pattern, a polarizing means mounted on said holding means before each eye, respectively, and a second polarizing means for each eye mounted on said holding means superimposed on said first polarizing means, respectively, and means for rotating the polarizing means before each eye relatively to each other whereby visibility of said test object as differentiated in the respective eyes can be controlled by correlating the polarizing planes of said first and said second polarizing means.

3. Ophthalmological apparatus for viewing a test object, comprising a trial frame for holding optical test lens elements before the eyes of a patient in substantially fixed relation thereto, a polarizing sheet mounted on said trial frame before each eye, respectively, a second polarizing sheet for each eye rotatably mounted on said holding means superimposed on said sheets, respectively, mounted on said trial frame means for jointly rotating said second sheets with the axes of polarization of the sheets so arranged that the total light flux passing through the sheets before both eyes remains substantially constant during said rotation so that visibility of the test object viewed through said polarizing means can be gradually shifted from one eye to the other, and means for disengaging said means for joint rotation so that visibility for the respective eyes of the test object can be controlled independently of the position of the eyes relatively to the test object.

HERMANN M. BURIAN.